(12) United States Patent
Bienas et al.

(10) Patent No.: US 8,503,361 B2
(45) Date of Patent: Aug. 6, 2013

(54) ENABLING IMS SERVICES FOR NON-IMS UES VIA A HOME BASE STATION SUBSYSTEM

(75) Inventors: Maik Bienas, Braunschweig (DE); Martin Hans, Bad Salzdetfurth (DE)

(73) Assignee: Infineon Technologies AG, Neubiberg (DE)

( * ) Notice: Subject to any disclaimer, the term of this patent is extended or adjusted under 35 U.S.C. 154(b) by 252 days.

(21) Appl. No.: 12/696,132

(22) Filed: Jan. 29, 2010

(65) Prior Publication Data
US 2011/0188446 A1   Aug. 4, 2011

(51) Int. Cl.
*H04W 4/00* (2009.01)
*H04L 12/66* (2006.01)

(52) U.S. Cl.
USPC ............................ 370/328; 370/353; 370/355

(58) Field of Classification Search
USPC ......................................... 370/328, 352–356
See application file for complete search history.

(56) References Cited

U.S. PATENT DOCUMENTS

| | | | | |
|---|---|---|---|---|
| 2002/0061746 | A1* | 5/2002 | Jo et al. | 455/433 |
| 2002/0107964 | A1* | 8/2002 | Tomoike | 709/225 |
| 2003/0154400 | A1* | 8/2003 | Pirttimaa et al. | 713/201 |
| 2004/0073928 | A1* | 4/2004 | Alakoski et al. | 725/62 |
| 2004/0203753 | A1* | 10/2004 | Rollender et al. | 455/432.1 |
| 2008/0092226 | A1* | 4/2008 | Horvath et al. | 726/12 |
| 2009/0070469 | A1 | 3/2009 | Roach et al. | |
| 2009/0239583 | A1* | 9/2009 | Jheng | 455/558 |
| 2010/0238920 | A1* | 9/2010 | Salkintzis et al. | 370/357 |

OTHER PUBLICATIONS

3GPP TR 23 832 V0.4.0 (May 2009); Technical Report; 3rd Generation Partnership Project; Technical Specification Group Services and System Aspects; IMS Aspects of Architecture for Home NodeB; Stage 2 (Release 9); pp. 1-61.
3GPP TS 23 206 V7.5.0 (Dec. 2007); Technical Specification; 3rd Generation Partnership Project; Technical Specification Group Services and System Aspects; Voice Call Continuity (VCC) between Circuit Switched (CS) and IP Multimedia Subsystem (IMS); Stage 2 (Release 7); pp. 1-36.

\* cited by examiner

*Primary Examiner* — Ronald Abelson (57) ABSTRACT

Apparatuses and methods for enabling IMS services for non-IMS UEs via a home base station subsystem are described. In various embodiments, a home base station subsystem includes a message generator configured to generate an Internet Protocol multimedia subscription request message comprising a unique user identifier and an information request message, the information request message requesting an Internet Protocol multimedia subscription for the user identified by the unique user identifier. The home base station subsystem also includes a transmitter configured to transmit the generated Internet Protocol multimedia subscription request message to a user database.

18 Claims, 9 Drawing Sheets

ENABLING IMS SERVICES FOR NON-IMS UES VIA A HOME BASE STATION SUBSYSTEM

BACKGROUND

Various embodiments relate generally to communication technologies, and in particular, to a technology for a non-IP Multimedia Subsystem (IMS) user to access an IMS network.

The Public Land Mobile Network (PLMN) defined by the 3rd Generation Partnership Project (3GPP) can be logically divided into two parts: a Core Network (CN) and an Access Network (AN). The CN can be subdivided into a Circuit Switched (CS) domain, a Packet Switched (PS) domain, and an IP Multimedia Subsystem (IMS).

In the CS domain, the Mobile Switching Center (MSC) handles several mobility and routing dependant functions for CS-based services. The main CS-based service is a voice call.

In the PS domain, a Serving GPRS Support Node (SGSN) handles several mobility and routing dependant functions needed for PS-based services. The SGSN is connected to a Gateway GPRS Support Node (GGSN), which is configured to offer access to the IMS. A network is conventionally organized so that the MSC, GGSN, and SGSN are connected to the HLR (Home Location Register). The HLR stores all subscriber specific data.

In the CS-Domain, the control of connections (e.g., reserving data transfer means) and calls (e.g., calling, negotiation of codecs, hang-up) are both done on the MSC. For example, after a successful establishment of a call, the MSC routes the voice data towards the network.

In the PS-domain, there is a division of duties between the control of connections (e.g., reserving network layer addresses or IP-addresses and means for PS-data transfer), otherwise known as "sessions" and the control of application layer services (e.g., voice calls with voice codec, data rate, required QoS). The SGSN controls sessions in addition to routing voice-data after successful establishment of a session. The IMS controls application layer services. For example, the IMS defines means to request and negotiate services and their parameters on an application layer between a UE and the connection endpoint. The IMS also relies on the core-network to setup and maintain the appropriate sessions via transferring the associated data through the network to the UE.

One feature of a conventional network, is the ability to update a position status of a UE (User Equipment) that has changed locations. In a conventional network, a UE in Idle Mode performs cell-selection autonomously and thus the network is not aware which cell the UE is currently located. The network is only aware of the Location Area (LA) which is in general an area spanned by a number of mobile radio cells. In case of network triggered connection setup is required the network pages the UE in all mobile radio cells of the LA that the UE is currently registered in. Each mobile radio cell indicates the LA where it belongs to by transmitting a Location Area Identity (LAI).

Figure 1:
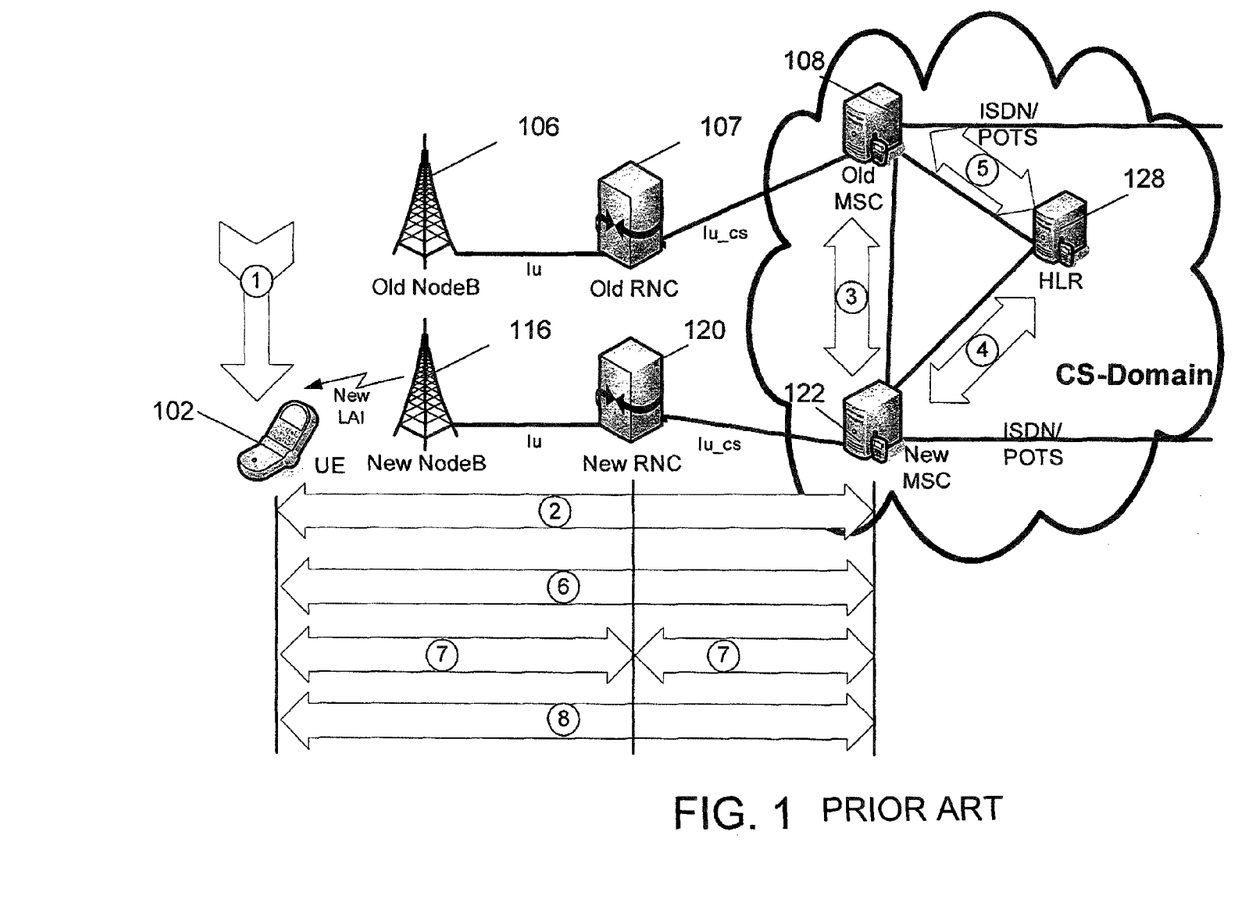
FIG. 1 shows a conventional location update procedure for a CS UE.

A conventional location update procedure for the CS domain user is shown in FIG. 1. More specifically, FIG. 1 shows a location update procedure that includes changing both the LA and MSC. Although the relation between MSCs and LA is a choice of the network operator, the location update procedure of FIG. 1 includes changing both the LA and MSC for a clear presentation of the location areas update procedure.

Prior to UE 102 moving from the cell of NodeB 106 to the cell of NodeB 116, UE 102 is registered at the LA of the cell of NodeB 106 and RNC 107 and obtained a TMSI from MSC 108. UE 102 has also stored the Location Area Identity (LAI) broadcasted by NodeB 106. At Step 1, UE 102, in idle mode, moves to the cell of NodeB 116. NodeB 116 transmits a different LAI than NodeB 106. Thus, a location update is initiated.

That is, when UE 102 moves from the cell of NodeB 106 to the cell of NodeB 116, UE 102 reads a LAI from the system information transmitted by NodeB 116. Because the LAI transmitted by NodeB 116 is different from the LAI received from NodeB 106 and stored in UE 102, UE 102 initiates a location update at Step 2 by transmitting a location updating request message towards NodeB 116 and Radio Network Controller (RNC) 120 of MSC 122. The location updating request message includes the Temporary Mobile Subscriber Identity (TMSI) assigned by NodeB 106 and the LAI of NodeB 106. An acknowledge message, which indicates the successful establishment of the radio resource connection, is transmitted back to UE 102 at 118.

The now "new" MSC 122 detects that the received LAI is different from its own LAI. At Step 3, MSC 122 thus uses the LAI received from UE 102 to obtain the address of MSC 108 and transmits a send parameters message to the MSC 108. A send parameters message also includes the TMSI sent to MSC 122 by UE 102. MSC 108 responds by sending the International Mobile Subscriber Identity (IMSI) that corresponds to the received TMSI user identity back to MSC 122.

At Step 4, MSC 122 sends an Update Location message to HLR 128. The Update Location message includes the IMSI of UE 102 and the address of MSC 122. HLR 128 updates the record for UE 102 with the received parameters and sends an Insert Subscriber Data message back to MSC 122. The message includes security credentials for UE 102. MSC 122 creates a record for UE 102 and transmits an Insert Subscriber Data Result message to HLR 128 to indicate the successful creation of the data record in MSC 122.

At Step 5, HLR 128 transmits a Cancel Location message to MSC 108. MSC 108 deletes the record associated with UE 102 and transmits a Cancel Location Result message back to HLR 128. HLR 128 transmits to MSC 122 an Update Location Result message indicating a successful location update in HLR 128.

At step 6, MSC 122 initiates the authenticating process for UE 102 by transmitting to UE 102 an authentication request message, which includes a security challenge. UE 102 verifies, based on the authentication request message, that the request is trustful and computes a result to the challenge. UE 102 then transmits the result back to MSC 122. MSC 122 compares the result with the stored data earlier obtained from HLR 128. If the result matches, UE 102 is authenticated.

At Step 7, MSC 122 initiates ciphering for the connection towards UE 102 by transmitting a Ciphering Mode Command message to RNC 120, which forwards the message to UE 102. UE 102 switches to cipher mode and transmits a Ciphering Mode Complete message to RNC 120, which forwards the message to MSC 122.

At Step 8, MSC 122 assigns a TMSI to UE 102 and transmits the TMSI with the message Location Updating Accept to UE 102. UE 102 starts using this TMSI and transmits the TMSI Reallocation Complete message back to MSC 122. This indicates the successful completion of the location updating procedure.

After successful completion of the location update procedure, the network is aware of the new location area of UE 102, MSC 122 has obtained required subscriber data, and UE 102 has obtained a new temporary ID, a TMSI.

The above procedure shown in FIG. 1 only allows UE 102 to use CS-domain network resources of a Core Network.

Using conventional techniques, UE 102 must initiate a GPRS attach procedure in order to obtain services from the PS-domain.

Figure 2:
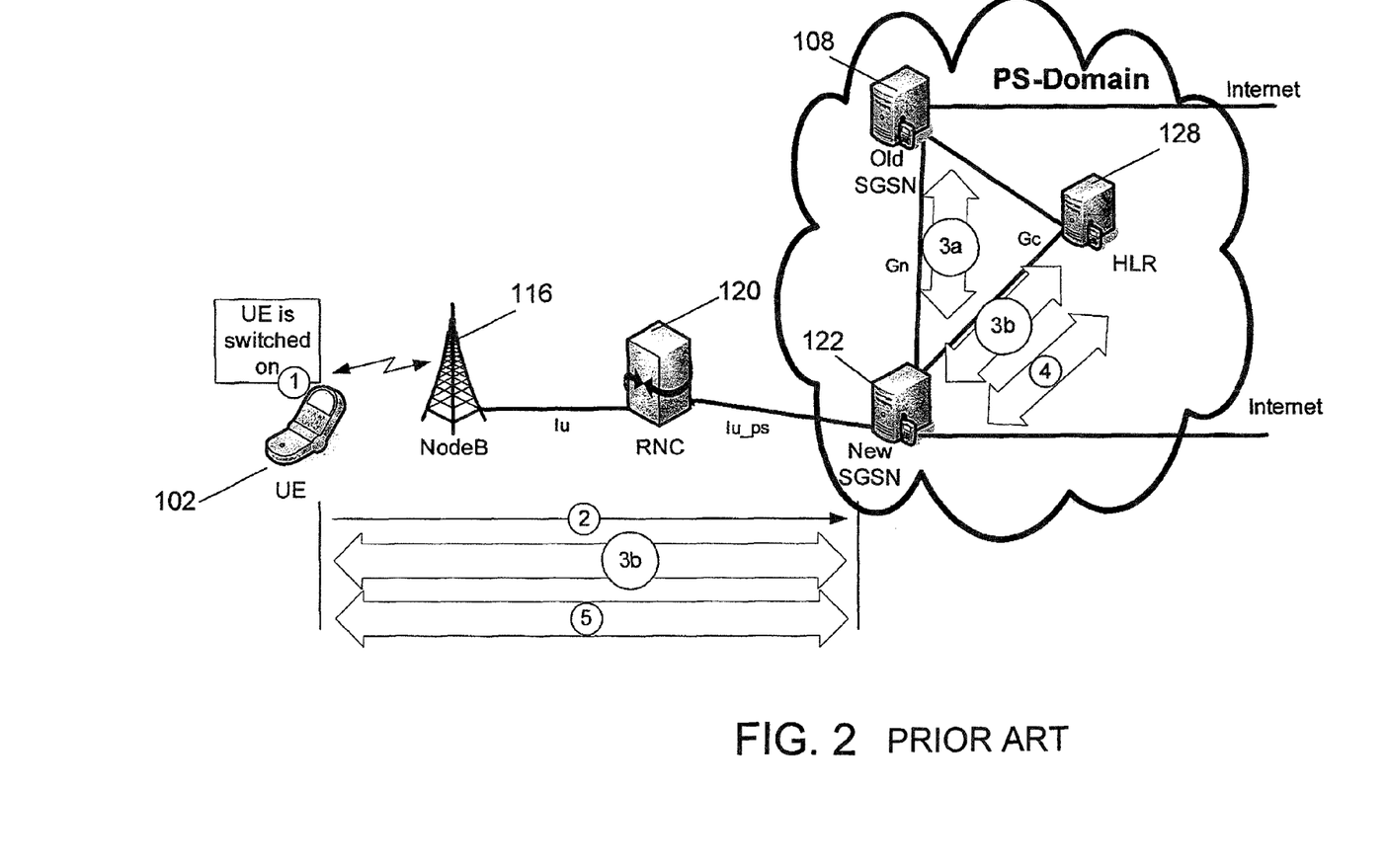
FIG. 2 shows a conventional GPRS attach procedure and associated message exchanges.

A conventional GPRS attach procedure and associated message exchanges are illustrated in FIG. 2.

At Step 1, UE 102 is either switched on or is otherwise not attached to the PS-Domain. At Step 2, UE 102 transmits an Attach Request message towards NodeB 114. The message is forwarded to RNC 120 and SGSN 122 and includes the RAI and the currently assigned P-TMSI or if a P-TMSI is not available, an IMSI.

At Step 3a, SGSN 122 transmits an Identification Request message to SGSN 108 by using the RAI previously received by UE 102. The message also includes in the P-TIMSI. SGSN 108 responds by sending a identification response message back to SGSN 122. The message includes the IMSI and security credentials.

At Step 3b, SGSN 122 sends a Send Authentication Info message, which includes the IMSI, to HLR 128. HLR 128 sends a Send Authentication Info ACK message, which includes the security credentials, back to SGSN 122. SGSN 122 initiates the authentication procedure for UE 102 by transmitting to UE 102 an Authentication and Ciphering Request message, which includes a security challenge. UE 102 verifies, based on the authentication request message, that the request is trustful and computes a result to the challenge. UE 102 then transmits the result back to SGSN 122 with an Authentication and Ciphering Response message. SGSN 122 compares the result computed by UE 102 with the stored data obtained from HLR 128, and if the result matches, UE 102 is authenticated.

At Step 4, SGSN 122 transmits an Update Location message, which includes the IMSI and new RAI, to HLR 128. HLR 128 updates the record for UE 102 with the received parameters and sends an Update Location ACK message back to SGSN 122.

At Step 5, SGSN 122 assigns a TMSI to UE 102 and transmits the message Attach Accept with the TMSI to UE 102. UE 102 utilizes the received TMSI and transmits an Attach Complete message back to SGSN 122. The message indicates the successful completion of the GPRS attach procedure.

The procedures of FIG. 1 and FIG. 2 only allow UE 102 to use CS domain and PS domain network resources of a Core Network. In order to use IMS-based services, UE 102 has to register in the IMS. Several requirements are defined for UEs to be able to register in the IMS, one of which is the presence of an IMS Subscriber Identity Module (ISIM). In the early phases of implementing IMS, it is expected that many UEs cannot fulfill these requirements, including UEs that do not have or cannot support an ISIM. To enable access to IMS by non-IMS compliant UEs, the GPRS-IMS Bundled Authentication (GIBA) procedure is defined. The procedure can be used by UEs which are using the PS domain to access the IMS.

Figure 3:
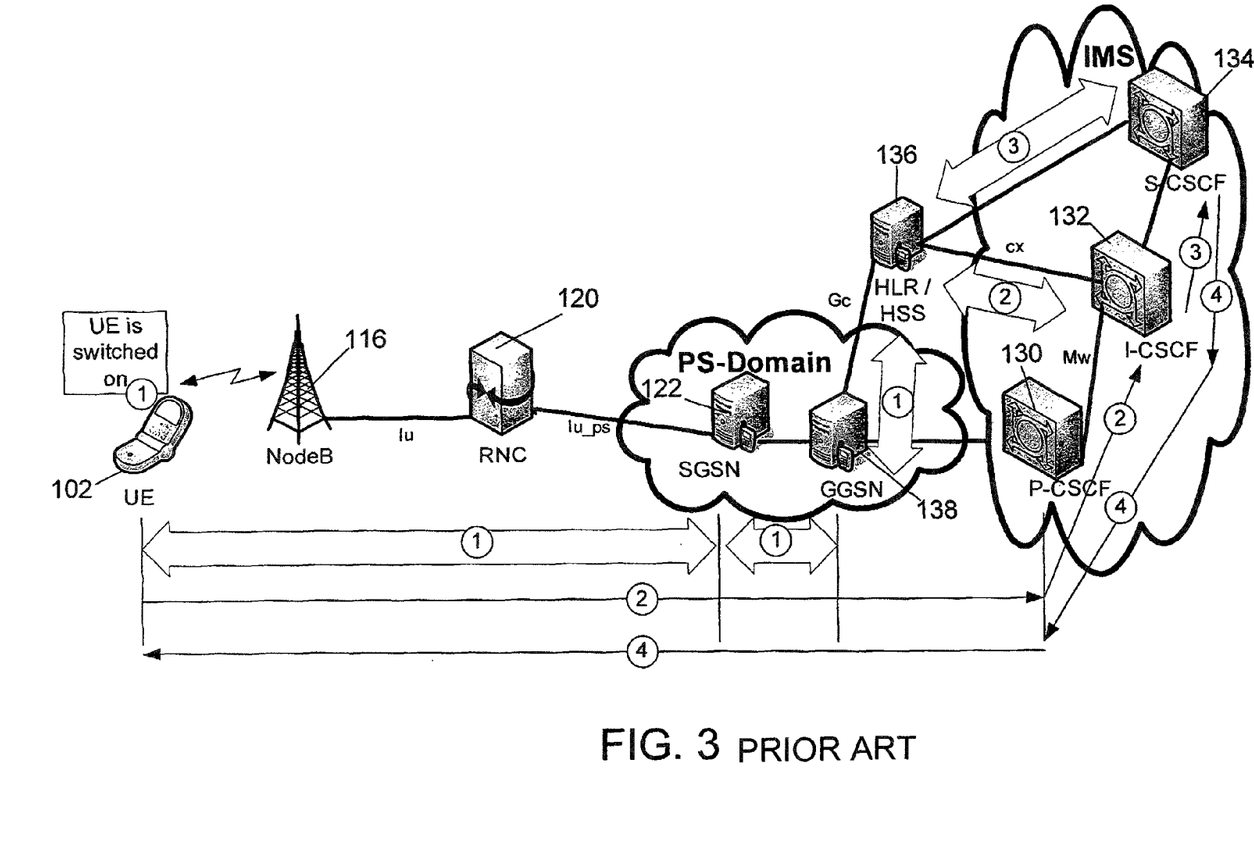
FIG. 3 shows a conventional GPRS-IMS Bundled Authentication procedure and message exchanges.

A conventional GPRS-IMS Bundled Authentication procedure and message exchanges are illustrated in FIG. 3.

Four network elements are relevant in the IMS:

Proxy Call Session Control Function (P-CSCF) 130 is the first contact point within the IMS and behaves like a Proxy, i.e. it accepts requests and services them internally or forwards them on.

Interrogating CSCF (I-CSCF) 132 is the contact point within an operator's network for all connections destined to a user of that network Operator, or a roaming user currently located within that network operator's service area.

Serving CSCF (S-CSCF) 134 performs the session control services for a UE. S-CSCF 134 maintains a session state as needed by the network operator for support of services.

The Home Subscriber Server (HSS) 136 is a subscriber database similar to an HLR, but with enhanced authentication, authorization, and accounting functionality.

At Step 1, UE 102 transmits an Activate PDPD Context Request message to SGSN 122 via NodeB 114 and RNC 120. The message establishes a communication link between GGSN 138 and UE 102. UE 102 then transmits a Create PDPD Context Request message to GGSN 138. A PDP address (e.g., an IP Address) is assigned by SGSN 122, GGSN 138, or by an external Packet Data Network. An Accounting Request Start Request message, which includes an assigned PDP address, MSISDN, and IMSI, is then transmitted to the HSS 136. HSS 136 stores the relation between the transmitted data and transmits an Accounting Request Start Answer message to GGSN 138, which also stores the relation between the data. GGSN 138 then transmits a Create PDP Context Response message to SGSN 122. SGSN 122 transmits an Activate PDPD Context Accept message, which includes the assigned PDP address, to UE 102.

At Step 2, UE 102 transmits an SIP Register message, which includes the assigned PDP address and the IMS Public User Identity (IMPU), to GGSN 138. GGSN 138 checks whether the PDP address is correct (e.g. it is not spoofed). If the PDPD address is correct, GGSN 138 forwards the message to P-CSCF 130. P-CSCF 130 checks the source IP address against the SIP "via" field, and if both are the same, P-CSCF 130 forwards the message to I-CSCF 132. I-CSCF 132 transmits a User Authentication Request message, which includes the IMPU, to HSS 136. HSS 136 acknowledges the authentication to I-CSCF 132 with the message User Authentication Answer.

At Step 3, I-CSCF 132 sends the SIP Register message to S-CSCF 134. This triggers S-CSCF 134 to transmit to HSS 136 the message Multimedia-Auth-Request, which includes the IMPU and an indication that GIBA is being used. HSS 136 maps IMPU to the IMSI or MSISDN of UE 102 and reads the stored IP address for UE 102. HSS 136 then transmits a Multimedia-Auth-Answer message, which includes the stored IP-Address, back to S-CSCF 134. S-CSCF 134 checks the received IP-Address with the IP-Address received from I-CSCF 132. If the received IP-Addresses are the same, S-CSCF 134 transmits a Server-Assignment-Request message to HSS 136. HSS 136 stores the received data and transmits a Server-Assignment-Answer back to S-CSCF 134.

At Step 4, S-CSCF 134 completes the GPRS-IMS Bundled Authentication procedure by transmitting an SIP 200 OK message back to UE 102.

The GPRS-IMS Bundled Authentication procedure shown in FIG. 3 requires integrating the data of a HLR into the HSS so that the HSS can register a legacy UE with a USIM and thus use the resources of the IMS. Such an approach requires replacing the conventional HLRs or overlying one or more special HSSes for providing IMS services on the conventional networks while the conventional HLRs remain unchanged to provide the CS and PS domain services.

Solutions under discussion by the Third Generation Partnership Project (3GPP) include using a Home Node B (HNB) and Home Node B-Gateway (HNB-GW) for access to the PS-Domain and IMS for voice services and require a connection between the HNB Subsystem and an MSC. This is unfavorable as the HNB Subsystem and MSC connection requires the operator providing additional signaling and network resources.

In addition, such a solution requires deriving the IMS subscription needed for IMS registration from the UE address used in the 3G core network, such as IMSI derived IMPU. In implementing the IMSI derived IMPU, the network element responsible for IMS registration generates the IMPU by using the IMSI of the relating UE (e.g. 2483235551234@323.248.imsi.3gppnetwork.org). Thus, HLRs or HSSes need to be configured to accept the IMS Registration from all UEs that have a valid IMSI. This requires the HLR/HSS to generate and maintain large numbers of related subscriber records.

Other solutions include an IMS client in the HNB. This requires storing the IMSI of the UE in the HNB in order to perform IMS registration. It is preferred, though, to keep the IMSI protected and therefore not to transmit it un-ciphered over the air to an HNB or store it in an un-secure location such as an HNB.

SUMMARY

Embodiments provide a home base station subsystem that includes a message generator configured to generate an Internet Protocol multimedia subscription request message comprising a unique user identifier and an information request message, the information request message requesting an Internet Protocol multimedia subscription for the user identified by the unique user identifier. The home base station subsystem also includes a transmitter configured to transmit the generated Internet Protocol multimedia subscription request message to a user database.

Embodiments further provide a user database system that includes a receiver configured to receive an Internet Protocol multimedia subscription request message comprising a unique user identifier and an information request message, the information request message requesting an Internet Protocol multimedia subscription for the user identified by the unique user identifier. The user database system further includes an Internet Protocol multimedia subscription generator configured to generate an Internet Protocol multimedia subscription for the user identified by the unique user identifier in the received Internet Protocol multimedia subscription request message. The user database system further includes a transmitter configured to transmit the Internet Protocol multimedia subscription to a home base station subsystem.

Embodiments further provide a home base station subsystem that includes a receiver configured to receive a circuit-switched based mobility management message and a message generator configured to generate a packet-switched based attach request message to attach to a packet-switched domain.

A home base station subsystem that includes a circuit-switched receiver configured to receive a circuit-switched based message comprising a user identifier and a packet-switched based message generator configured to generate a packet-switched based message to request security-related information associated with the received user identifier. The home base station subsystem further includes a packet-switched based receiver configured to receive a packet-switched based authentication request message and a circuit-switched based message generator configured to generate a circuit-switched based message to request authentication of a communication device associated with the user identified by the user identifier, upon receipt of the packet-switched based authentication request message. The home base station subsystem further includes a circuit-switched transmitter to transmit the circuit-switched based message to the communication device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of embodiments. In the following description, various embodiments are described with reference to the following drawings, in which.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The following embodiments will be disclosed on the basis of a data communication relationship between a Home Node B Subsystem (HNBS) comprising a femtocell and a HNB-GW and a mobile radio communication terminal device, such as e.g. a user equipment (UE). In this case, a femtocell is used as a node of a mobile radio communication network and can directly communicate with a UE.

The term "HNBS" may include a femtocell, HNB, HeNB, a HNB-GW and/or any network element that may be placed in between a HNB and HNB-GW.

The term "Home Location Register/Home Subscriber Server" (HLR/HSS) may include a modified HLR or HSS.

The term "femtocell" may be replaced with access point base station, Home Node B (HNB), or Home eNodeB B (HeNB). The term "Home eNodeB" (HeNB) is used for the radio access technologies (RAT) OFDMA/SC-FDMA according to LTE. The term "Home Node B" (HNB) is used for the radio access technology (RAT) W-CDMA.

In various embodiments, a 'Home NodeB' may be understood in accordance with 3GPP as a trimmed-down version of a cellular mobile radio base station optimized for use in residential or corporate environments (e.g., private homes, public restaurants or small office areas). In various examples throughout this description, the terms 'Home Base Station', 'Home NodeB', 'Home eNodeB', and 'Femtocell' are referring to the same logical entity and will be used interchangeably throughout the entire description.

The so-called 'Home Base Station' concept shall support receiving and initiating cellular calls at home, and uses a broadband connection (typically DSL, cable modem or fiber optics) to carry traffic to the operator's core network bypassing the macro network architecture (including legacy NodeBs or E-NodeBs, respectively), i.e. the legacy UTRAN or E-UTRAN, respectively. Femto Cells shall operate with all existing and future handsets rather than requiring customers to upgrade to expensive dual-mode handsets or UMA devices.

From the customer's perspective, 'Home NodeBs' offer the user a single mobile handset with a built-in personal phonebook for all calls, whether at home or elsewhere. Furthermore, for the user, there is only one contract and one bill. Yet another effect of providing 'Home NodeBs' may be seen in the improved indoor network coverage as well as in the increased traffic throughput. Moreover, power consumption may be reduced as the radio link quality between a handset and a 'Home Base Station' may be expected to be much better than the link between a handset and legacy 'NodeB'.

In an embodiment, access to a 'Home NodeB' may be allowed for a closed user group only, i.e. the communication service offering may be restricted to employees of a particular company or family members, in general, to the members of the closed user group. This kind of 'Home Base Stations' may be referred to as 'Closed Subscriber Group Cells' (CSG Cells) in 3GPP. A mobile radio cell which indicates being a CSG Cell may need to provide its CSG Identity to the mobile radio communication terminal devices (e.g. the UEs). Such a mobile radio cell may only be suitable for a mobile radio communication terminal device if its CSG Identity is e.g. listed in the mobile radio communication terminal device's CSG white list (a list of CSG Identities maintained in the mobile radio communication terminal device or in an associated smart card indicating the mobile radio cells which a particular mobile radio communication terminal device is allowed to use for communication). In various embodiments, a home base station may be a consumer device that is connected to the mobile radio core network via fixed line (e.g. DSL) or wireless to a mobile radio macro cell. It may provide access to legacy mobile devices and increase the coverage in buildings and the bandwidth per user. In various embodiments, a home base station may be run in open or closed mode. In closed mode the home base station may provide access to a so-called closed subscriber group (CSG) only. Examples for such closed subscriber groups are families or some or all employees of a company, for example.

As a 'Femto Cell' entity or 'Home Base Station' entity will usually be a box of small size and physically under control of the user, in other words, out of the MNO's domain, it could be used nomadically, i.e. the user may decide to operate it in his apartment, but also in a hotel when he is away from home, e.g. as a business traveler. Additionally a 'Home NodeB' may be operated only temporarily, i.e. it can be switched on and off from time to time, e.g. because the user does not want to operate it over night or when he leaves his apartment.

The term "user equipment" may be replaced with mobile radio communication terminal device (MCD), mobile phone, or terminal device. The term "legacy UE" may include UEs which are able to operate as specified for Release 7 of UMTS and/or other non-IMS UEs not able to directly establish a connection with the IMS.

Figure 4:
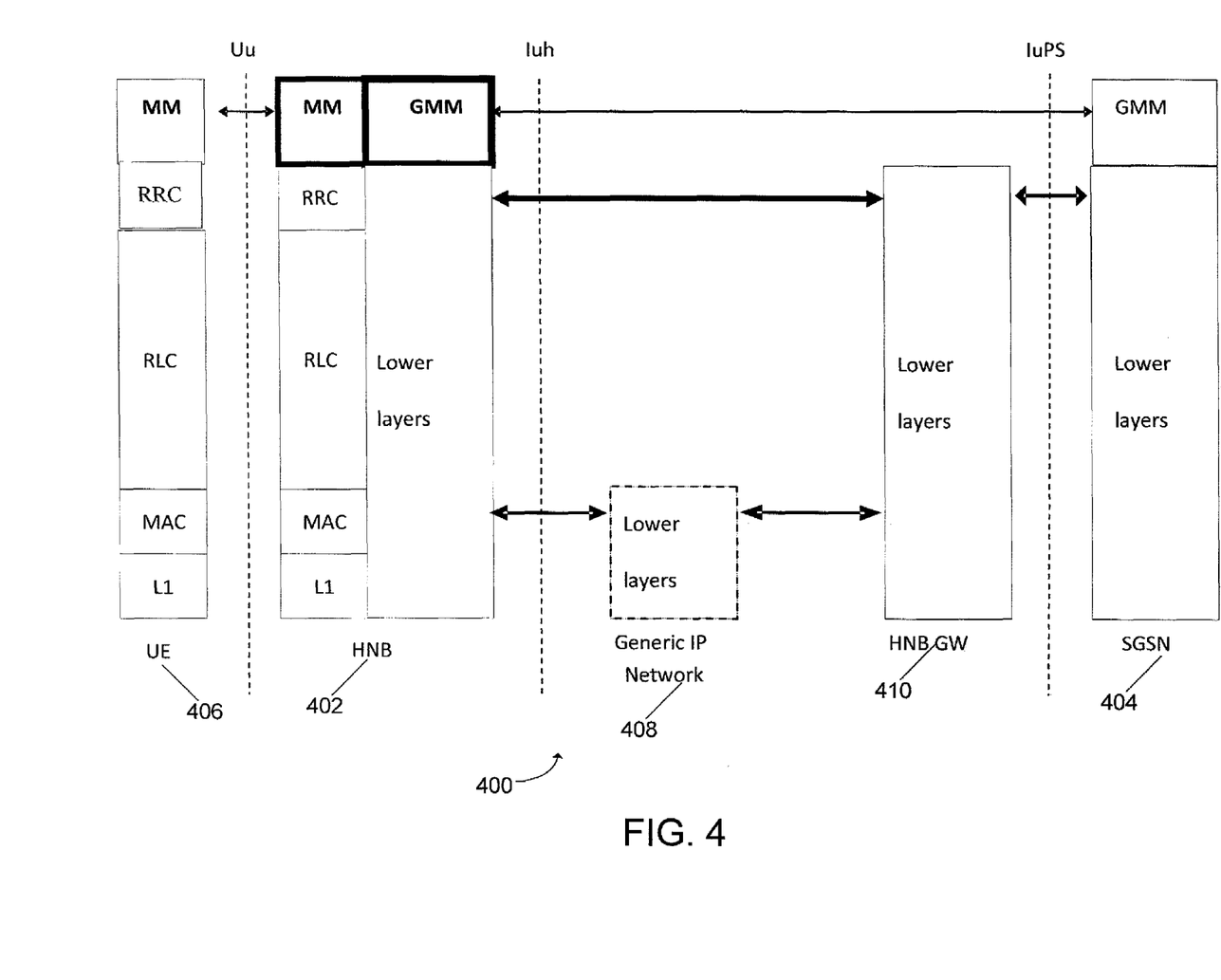
FIG. 4 shows a communication network according to an embodiment.

FIG. 4 shows communication network 400 according to according to an embodiment. In some embodiments, messages between HNB 402 and SGSN 404 are based on GPRS Mobility Management (GMM) messages. In some embodiments, messages between HNB 402 and UE 406 are based on Mobility Management (MM) messages. HNB 402 converts the protocols/messages. For example, the GMM message Authentication and Ciphering Request from SGSN 404 is converted into the MM message Authentication Request and sent to UE 406. Another example is the MM message Authentication Response from UE 406 is converted into the GMM message Authentication and Ciphering Response and sent to SGSN 404. As a result, the authentication parameters AUTN and RAND are forwarded by the HNB 402 to UE 406 without change and the Authentication Response Parameter is also forwarded by HNB 402 to SGSN 404 without change.

HNB 402 may transmit date of the lower protocol layers to HNB-GW 410 over IP network 408. In alternative embodiments, HNB-GW 410 may perform the GMM to MM conversion functions.

The content of the above messages are described in the tables below:

TABLE 1

AUTHENTICATION AND CIPHERING REQUEST MESSAGE CONTENT

| IEI | Information Element | Type/Reference | Presence | Format | Length |
|---|---|---|---|---|---|
| | Protocol discriminator | Protocol discriminator 10.2 | M | V | ½ |
| | Skip indicator | Skip indicator 10.3.1 | M | V | ½ |
| | Authentication and ciphering request message identity | Message type 10.4 | M | V | 1 |
| | Ciphering algorithm | Ciphering algorithm 10.5.5.3 | M | V | ½ |
| | IMEISV request | IMEISV request 10.5.5.10 | M | V | ½ |
| | Force to standby | Force to standby 10.5.5.7 | M | V | ½ |
| | Authentication and ciphering reference number | A&C reference number 10.5.5.19 | M | V | ½ |
| 21 | Authentication parameter RAND | Authentication parameter RAND 10.5.3.1 | O | TV | 17 |
| 8- | GPRS ciphering key sequence number | Ciphering key sequence number 10.5.1.2 | C | TV | 1 |
| 28 | Authentication parameter AUTN | Authentication parameter AUTN 10.5.3.1.1 | O | TLV | 18 |

TABLE 2

AUTHENTICATION REQUEST MESSAGE CONTENT

| IEI | Information element | Type/Reference | Presence | Format | Length |
|---|---|---|---|---|---|
| | Mobility management protocol discriminator | Protocol discriminator 10.2 | M | V | 1/2 |
| | Skip Indicator | Skip Indicator 10.3.1 | M | V | 1/2 |
| | Authentication Request message type | Message type 10.4 | M | V | 1 |
| | Ciphering key sequence number | Ciphering key sequence number 10.5.1.2 | M | V | 1/2 |
| | Spare half octet | Spare half octet 10.5.1.8 | M | V | 1/2 |
| | Authentication parameter RAND (UMTS challenge or GSM challenge) | Auth. parameter RAND 10.5.3.1 | M | V | 16 |
| 20 | Authentication Parameter AUTN | Auth. parameter AUTN 10.5.3.1.1 | O | TLV | 18 |

TABLE 3

AUTHENTICATION RESPONSE MESSAGE CONTENT

| IEI | Information element | Type/Reference | Presence | Format | Length |
|---|---|---|---|---|---|
| | Mobility management protocol discriminator | Protocol discriminator 10.2 | M | V | 1/2 |
| | Skip Indicator | Skip Indicator 10.3.1 | M | V | 1/2 |
| | Authentication Response message type | Message type 10.4 | M | V | 1 |
| | Authentication Response parameter | Auth. Response parameter 10.5.3.2 | M | V | 4 |
| 21 | Authentication Response Parameter (extension) | Auth. Response parameter 10.5.3.2.1 | O | TLV | 3-14 |

TABLE 4

AUTHENTICATION AND CIPHERING RESPONSE MESSAGE CONTENT

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Authentication and ciphering response message identity | GPRS message type 10.4 | M | V | 1 |
| | A&C reference number | A&C reference number 10.5.5.19 | M | V | 1/2 |
| | Spare half octet | Spare half octet 10.5.1.8 | M | V | 1/2 |
| 22 | Authentication parameter Response | Authentication Response parameter 10.5.3.2 | O | TV | 5 |
| 23 | IMEISV | Mobile identity 10.5.1.4 | O | TLV | 11 |
| 29 | Authentication Response parameter (extension) | Authentication Response parameter 10.5.3.2.1 | O | TLV | 3-14 |

Figure 5:
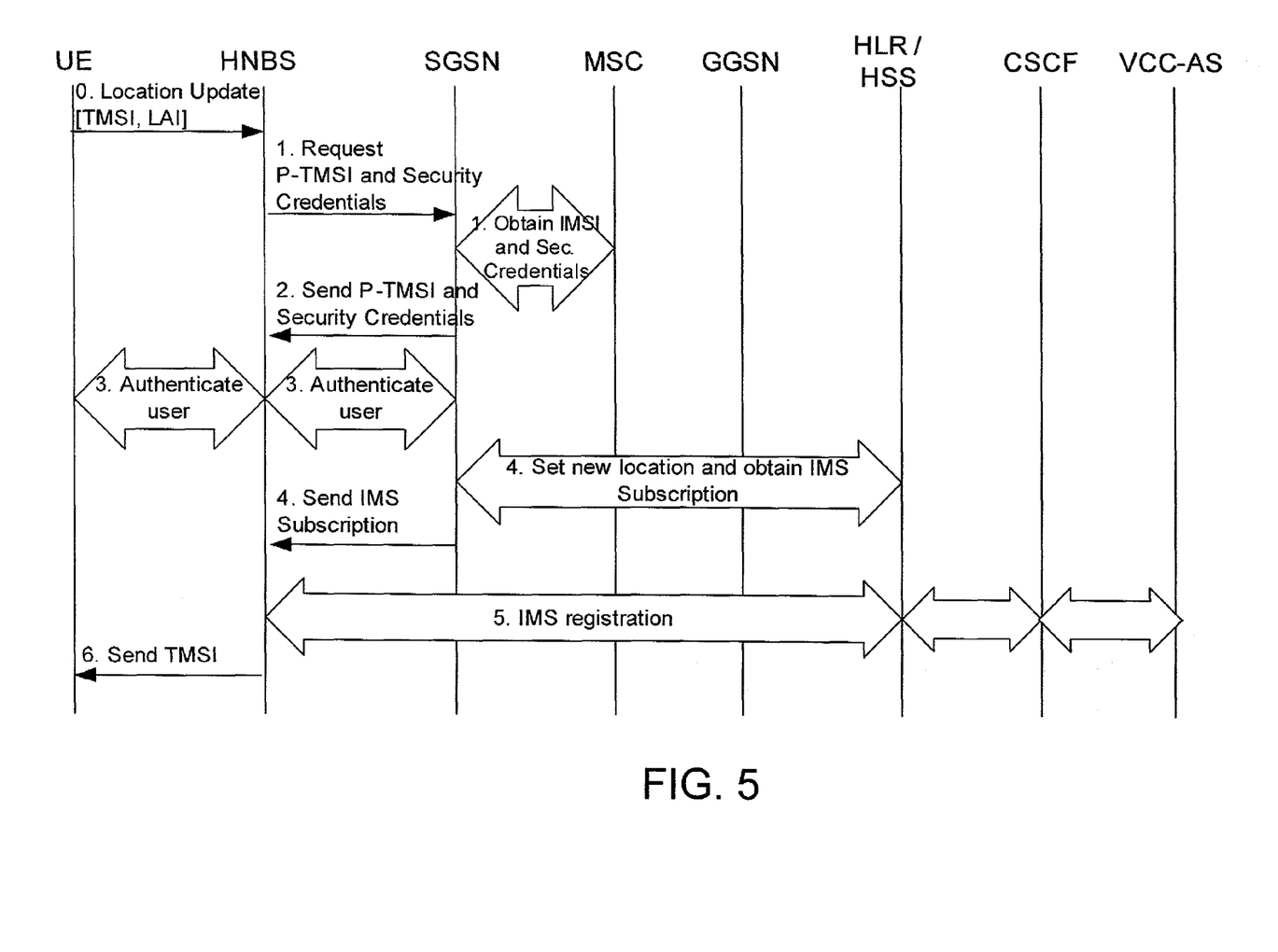
FIG. 5 shows a message sequence chart of a circuit switch user equipment accessing an IP Multimedia Subsystem network via a Home Node Subsystem according to an embodiment.

FIG. 5 shows a message sequence chart of a circuit switch user equipment accessing an IP Multimedia Subsystem network via a Home Node Subsystem according to an embodiment.

At Step 0, Legacy UE, for example a UE based on UMTS Release 7, sends a location update message to HNBS in order for the Legacy UE to connect to the inventive HNBS. The location update message triggers the HNBS to perform the following steps:

At Step 1, the HNBS requests the SGSN for a P-TMSI and security credentials for the Legacy UE. The SGSN retrieves the IMSI from the MSC and stores the relation between IMSI and P-TMSI. This aspect of the procedure may have the effect that it removes from the MSC the signaling load for mobility management.

At Step 2, SGSN sends and HNBS derives the P-TMSI and the security credentials needed for ciphering data towards the Legacy UE. This aspect of the procedure may have the effect that no connection between the HNBS and a MSC is required.

At Step 3, HNBS forwards authentication information between the core network and the Legacy UE by converting CS-based and PS-based transport protocols. The IMSI is not transmitted to the HNBS. This aspect of the procedure may have the effect that the IMSI is secure in the network and not accessible through the potentially vulnerable HNBS.

At Step 4, HNBS derives an IMS subscription for the Legacy UE from an HSS, wherein the HSS stores the IP-Address of the HNBS, deletes the MSC as the paging location, and sets the IMS as new paging location in the HLR/HSS. This aspect of the procedure may have the effect that it allows the network or network operator to decide whether IMS access will be allowed for a requesting UE. Further, the HLR/HSS is not required to create IMS subscriber records for all UEs registered in the CS domain. It may be sufficient to create an IMS record when needed for the first time.

At Step 5, the HNBS registers the Legacy UE in the IMS and in the Virtual Channel Connection Access Stratum (VCC-AS) based on the IMS subscription data. The IP-Address of the HNBS is included in the Register message. This aspect of the procedure may have the effect that it is difficult to fake the subscription. For example, network security is maintained by not configuring the HNBS to generate the IMS subscription.

At Step 6, the HNBS generates a TMSI for the Legacy UE and transmits the TMSI via a ciphered connection to the Legacy UE. The generated TMSI may be identical to the P-TMSI received from the SGSN. This aspect of the procedure may have the effect that the CS-based signaling for Mobility Management could be offered without requiring a MSC.

As a result of the message sequence of FIG. 4, the Legacy UE can establish a CS-based connection for a voice call as it would normally. This call is converted by the HNBS into a PS-based call, in some embodiments a VoIP-call, and controlled by the VCC-AS. In some embodiments, the above procedure results in not using any CS-based network elements (e.g., a MSC) in the core network for establishing and maintaining a call initiated by a Legacy UE. In some embodiments, when an incoming voice call for the Legacy UE reaches the core network, the call is transported via PS-based transport means to the HNBS, wherein the call is converted into a CS-based voice call by the HNBS and transmitted to the UE.

Figure 6A:
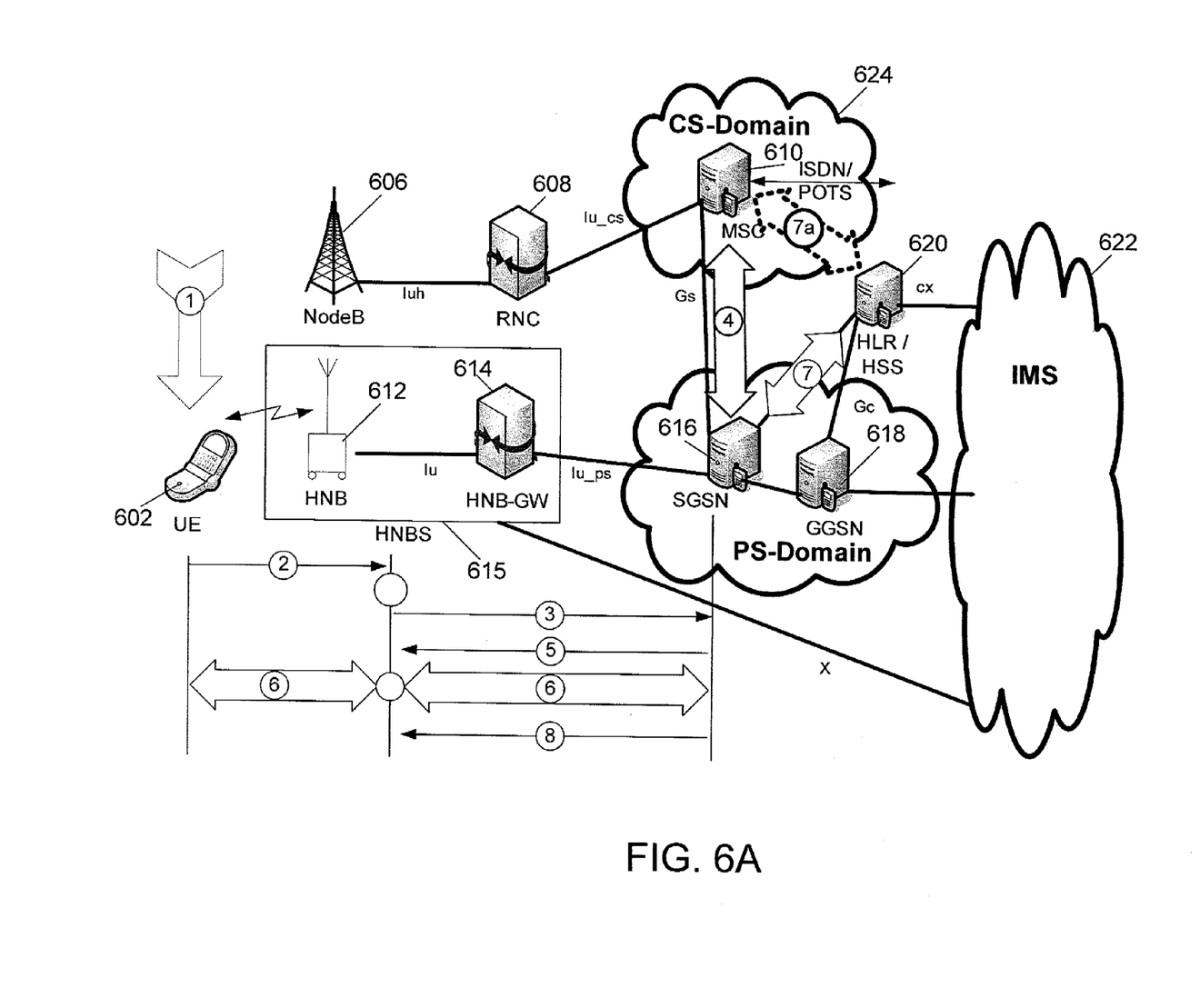
FIGS. 6A and 6B show a message sequence chart and network map of a circuit switch user equipment accessing an IP Multimedia Subsystem network via a Home Node Subsystem according to an embodiment.
Figure 6B:
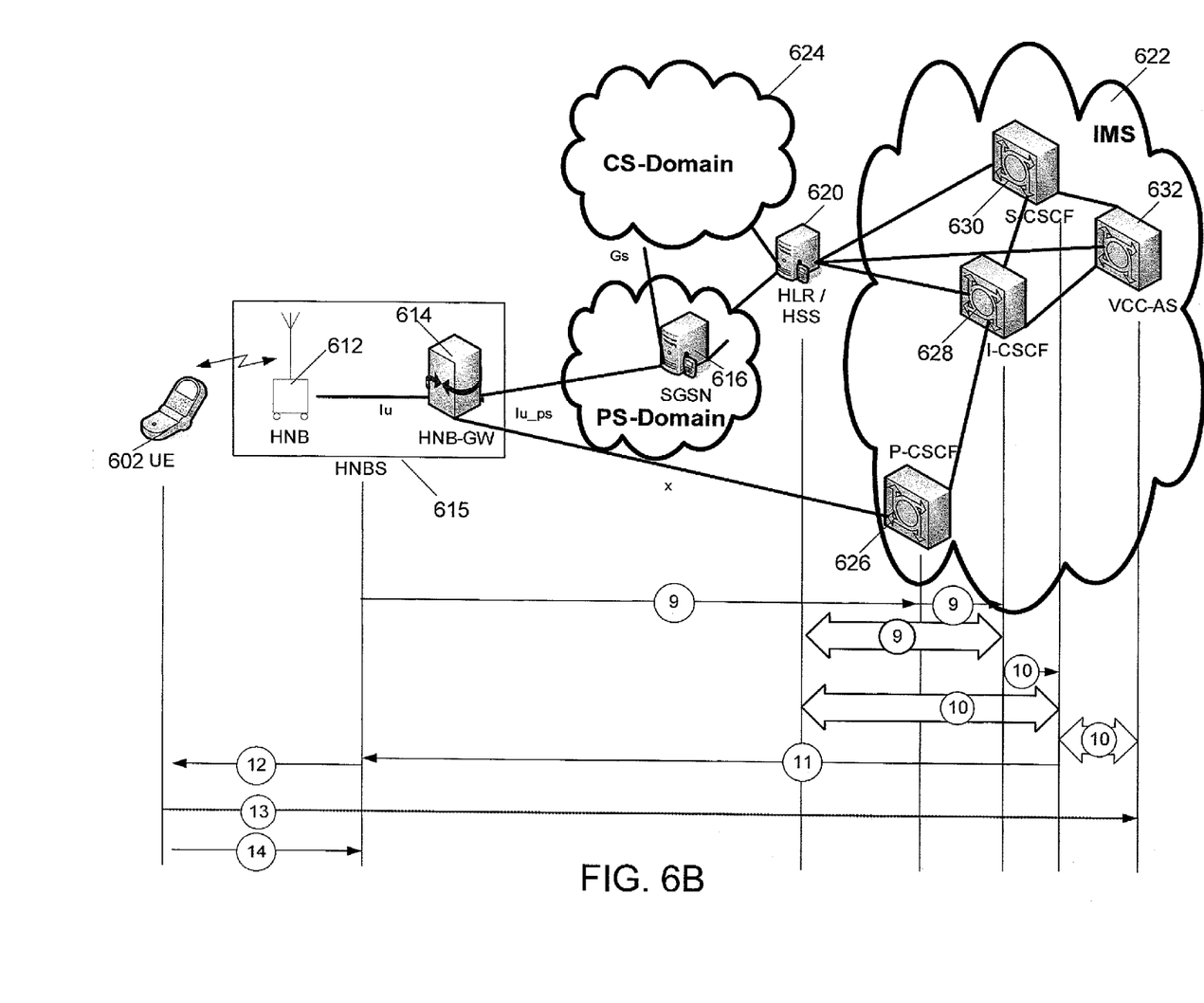

FIGS. 6A and 6B shows a message sequence chart and network map of a circuit switch user equipment accessing an IP Multimedia Subsystem network via a Home Node Subsystem according to an embodiment.

As shown in FIG. 6A, at Step 1, UE 602 is IMSI attached to the CS-domain via NodeB 606, RNC 608, and MSC 610. UE 602, from a previous procedure, has obtained and stored a LAI and a TMSI. UE 602 moves, in idle mode in some embodiments, into the coverage area of HNB 612, which transmit a different LAI. UE 602 selects HNB 612 and detects that the LAI received from HNB 612 is different from the stored LAI. Thus, a location update procedure is triggered.

At Step 2, UE 602 transmits a location updating request message to HNB-GW 614 via HNB 612. From the perspective of UE 602, the procedure of FIGS. 6A and 6B, including the location updating request message, is identical to sending the message to MSC 610. HNB 612 routes to HNB-GW 614 the currently assigned TMSI and the LAI received from the "old" NodeB 606.

At Step 3, HNB-GW 614 converts the message into a Location Update and IMS Subscription Request message and transmits it to SGSN 616. That is, an embodiment includes a location update for UE 602 and to obtain an IMS Subscription from HLR/HSS 620. Location Update and IMS Subscription Request message includes the TMSI and LAI obtained by the UE 602 from the "old" cell of NodeB 606 and the IP-Address used by HNBS 615.

At Step 4, SGSN 616 detects that the received LAI is different from its own RAI. SGSN 616 then uses the old LAI to obtain the address of "old" MSC 610 and transmits a Send Parameters message to MSC 610 in order to obtain an identification of UE 602. The Send Parameters message includes the TMSI of UE 602. MSC 610 sends the corresponding user identity (IMSI) and the security credentials associated with UE 602 back to SGSN 616. In some embodiments, if no credentials are available from MSC 610, SGSN 616 requests them from HLR/HSS 620.

At Step 6, SGSN 616 generates a P-TMSI for UE 602 and stores the P-TMSI and the security credentials associated with UE 602. SGSN 616 then transmits the security credentials and the P-TMSI to HNBS 615. In some embodiments, the stored security credentials are used when UE 602 performs a GPRS-attach in order to use PS-based services in addition to the CS-services. In such an embodiment, SGSN 616 is prepared to receive an Attach Request message from UE 602.

SGSN 616 will update the location in HLR/HSS 620 and will transmit the P-TMSI to UE 602. Thus, it is not required to derive the IMSI or the security credentials from MSC 610 again. In some embodiments, the stored P-TMSI is used when UE 602 initiatives a location update procedure from in a different cell (e.g. a macro cell surrounding HNB 612. In such an embodiment, SGSN 616 responses to the requesting MSC or SGSN with the IMSI of UE 602.

At Step 6, SGSN 616 initiates the authentication procedure by transmitting an Authentication and Ciphering Request message to UE 602. HNB-GW 614 receives this request and forwards it with CS-based transport means (e.g., the mobility management protocol layer) to UE 602. UE 602 verifies, based on the received data, that the request is trustful and computes a result to the challenge. UE 602 transmits the result back to SGSN 616 by transmitting an Authentication and Ciphering Response message. HNB-GW 614 receives this request and forwards it with PS-based transport means (e.g., the GPRS mobility management protocol layer) to SGSN 616. SGSN 616 compares the result with the stored data obtained from HLR/HSS 620. If the result matches, UE 602 is authenticated. This aspect of the procedure may have the effect that the procedure enables the authentication among a CS-based UE and PS-based network entities without a degradation of network security. For example, it would be difficult to fake the authentication procedure by HNBS 615.

At Step 7, SGSN 616 transmits an Update Location and Proxy IMS ID Request message to HLR/HSS 620. The message includes the IMSI, the IP-Address of HNBS 615, and an indication that IMS 622 will be used for voice services. That is, in some embodiments, IMS 622 will replace CS domain 624 for voice services. HLR/HSS 620 checks, based on the IMSI, whether the UE 602 should get permission to access IMS 622. The decision could be based on, for example, a user's contract/tariff agreements. If IMS 622 access is acceptable and if no IMS data record exists for the UE 602, (e.g. because this is the first time the user enters a HNBS coverage area that performs an IMS registration for UE 602) HLR/HSS 620 generates an IMPU for UE 602. In some embodiments, HLR/HSS 620 may include the MSISDN or other known IDs of the user and/or UE 602 into the IMPU. In some embodiments, a randomly generated number may be included into the IMPU so that it is more difficult to fake an IMPU. HLR/HSS 620 updates the record for UE 602 with the received and generated parameters. HLR/HSS 620 deletes the "connection" to MSC 610, which was formerly used to page UE 602. HLR/HSS 620 also stores data to indicate that IMS 622 pages UE 602 and stores the IP-Address of HNBS 615. HLR/HSS 620 sends an Update Location ACK and Proxy IMS ID Assignment message back to SGSN 616.

Some embodiments include Step 7a. At Step 7a, HLR/HSS 620 transmits a Cancel Location message to old MSC 610. MSC 610 deletes the record and transmits a Cancel Location Result message back to HLR/HSS 620. In other embodiments, the deletion may also be performed in MSC 610 when UE 602 does not transmit a Location Updating Request message to MSC 610 within a predefined period.

At Step 8, SGSN 616 forwards the IMPU to HNB-GW 614.

As shown in FIG. 6B, at Step 9, HNB-GW 614 operates as an IMS client to IMS 622 and performs all relevant steps to register in the IMS 622 on behalf of UE 602. HNB-GW 614 transmits a SIP Register message to P-CSCF 626. The SIP Register message includes the IP-Address of HNBS 615 and the IMPU. P-CSCF 626 checks the source IP address against the SIP field and forwards the message to I-CSC 628 if both are the same. I-CSCF 628 transmits a User Authentication Request message, which includes the IMPU and the IP-Address of HNBS 615, to HLR/HSS 620. HLR/HSS 620 compares the received IMPU and IP-Address with the stored parameters and acknowledges the authentication to I-CSCF 628 with a User Authentication Answer message if the received parameters are equal to the stored parameters. IMS nodes (e.g., CSCFs) then execute the register procedures.

At Step 10, I-CSCF 628 sends a SIP REGISTER message to S-CSCF 630. S-CSCF 630 then transmits a Server Assignment-Request message to HLR/HSS 620. HLR/HSS 620 stores the received data associated with UE 602 and transmits a Server Assignment Answer back to S-CSCF 630. In some embodiments, HLR/HSS 620 will use this data to page UE 602 via IMS 622. S-CSCF 630 sends the SIP REGISTER message to VCC-AS 632, which responses with a 200 OK message back to S-CSCF 630. Registration at VCC-AS 632 is performed to enable Voice-Call-Continuity when handover to surrounding macro cells occurs.

At Step 11, S-CSCF 630 transmits a SIP 200 OK message back to HNB-GW 614.

At Step 12, HNB-GW 614 receives the SIP 200 OK message. HNB-GW 614 then generates a TMSI for UE 602, stores the TMSI associated with UE 602, and transmits a Location Updating Accept message, which includes the TMSI, to UE 602. The message is encrypted with the security credentials received from SGSN 616. In some embodiments, the generated TMSI may be identical to the P-TMSI received from SGSN 616. HNB-GW 614 is now able to translate incoming VCC-calls into a CS call and forwards the CS voice data to UE 602.

Step 13: The HNB-GW 614 transmits a message to the VCC-AS with the preferred domain for this UE 602. In various embodiments, the Domain is the PS-Domain/IMS 622 in case that UE 602 is attached to both domains. The message is transmitted by using http. The address of the VCC-AS may be obtained by previously received messages from the HLR/HSS or the address is preconfigured during set-up of the HNB-GW 614. In case that the HNB-GW 614 already set this status for this UE 602, there is no need to transmit this message again.

In alternative embodiments, Step 13 may be omitted if the preferred domain is already known by the VCC-AS. For example, if the PS-Domain is set by default as the preferred domain after a UE is registered in the IMS or the preferred domain was set formerly by other means (e.g. by the user), then Step 13 may be omitted.

At Step 14, UE 602 utilizes the TMSI and transmits a TMSI Reallocation Complete message back to HNB-GW 614. This indicates the successful completion of the location updating procedure.

Thus, HNB-GW 614 will translate every CS-signaling on the side of UE 602 into SIP/IMS-signaling on NW-side (network-side) and vice versa utilizing the established connection towards IMS 622 and emulating an MSC towards UE 602. HNB-GW 614 utilizes the security credentials received by SGSN 616 to encrypt messages transmitted over the air to UE 602 and to decrypt messages received over the air from UE 602.

A voice call is established by UE 602 transmitting a Setup message to HNBS 615. This triggers HNBS 615 to set up a SIP Session by transmitting an Invite message to P-CSCF 626. The messages received by HNBS 615 during this procedure are translated into CS-based Call Control messages and transmitted to UE 602 if applicable.

It will be understood that the message sequence chart and network map of FIGS. 6A and 6B is only one possible message sequence, and that there may be many variations or additions to the architecture. For example, other embodiments may include UE 602 re-registration IMS 622, or IMS 622 re-registration or deregistration UE 602.

In summary, embodiments include a HNBS configured to perform IMS-related tasks on behalf of legacy UEs. In some embodiments, a HNBS is configured to perform a protocol conversion function for received mobility management messages used by a UE in the CS-Domain (e.g., a location updating request). For example, a HNBS may convert a received CS-Domain mobility management message into a messages that will set the IMS as new location for paging and will request for an IMS subscription at the HLR/HSS.

In some embodiments, an HNBS is configured to perform a protocol conversion function that is able to receive 3G PS Domain authentication messages from the network (e.g. an Authentication and Ciphering Request transmitted via the Iugs-Interface) and forward these messages with protocols used in the 3G CS Domain to the UE and vice versa.

In some embodiments, an HNBS is configured to generate a TMSI for a UE that transmitted a Location Updating Request and transmits the TMSI via a ciphered connection to the requesting UE.

In some embodiments, an HNBS is configured to set the IMS as the preferred domain in the VCC-AS for a UE that connects to the HNBS.

The above embodiments are advantageous because they do not require any changes for legacy UEs. Further, no connection towards an MSC is required when a UE connects to an HNBS. Also, in some embodiments, an IMSI is not required to be stored in an HNBS. Therefore, the level of security is not degraded by the described embodiments.

In some embodiments, an HLR/HSS is configured to receive a request for a IMS Subscription. This request may be combined with a request for location update. The formerly stored location (e.g., an MSC) is deleted. A flag to use the IMS for paging and the IP-Address of the HNBS are inserted. If no IMS subscription record exists for a UE, the HLR/HSS is configured to create a new record for an IMS subscriber. A response with the requested IMS Subscription is transmitted to the requesting entity. The HLR/HSS may also reject the request.

The above embodiments are advantageous because it is up to the network or the Operator to decide whether IMS access will be allowed for a user or UE. The above embodiments are also advantageous because it is not required that the HLR/HSS create IMS subscriber records for all UEs registered in the CS domain. In some embodiments, it is sufficient to create such a record when it is needed for the first time.

In some embodiments, an SGSN is configured to transmit security credentials for an UE connecting to an HNBS. In some embodiments, upon received a update Location and Proxy IMS ID Request message, the SGSN is configured to request a temporary IMS Subscription from the HLR/HSS and to transmit the IP-address of the HNBS to the HLR/HSS. In some embodiments, the SGSN is configured to receive an Update Location ACK and Proxy IMS ID Assignment message from a HLR/HSS and forward the received IMS subscription towards the requesting entity.

The above embodiments are advantageous because they may utilize existing routing functions of the core network.

Figure 7A:
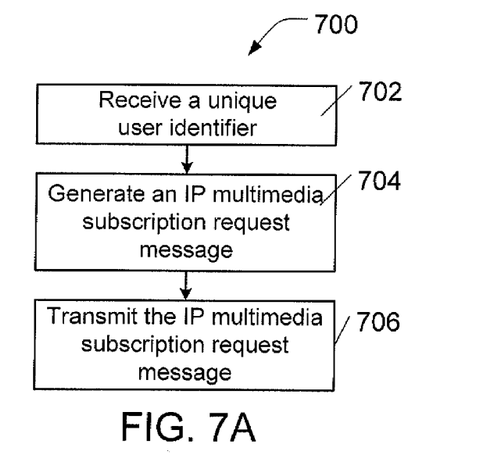
FIGS. 7A-7D show communication methods according to embodiments.

FIGS. 7A-7D show communication method embodiments. In FIG. 7A, method 700 begins at 702 with receiving, by a home base station system, a unique user identifier, for example a TMSI from a UE. At 704, an Internet Protocol multimedia subscription request message comprising the unique user identifier and an information request message is generated by a home base station system. The information request message requests an Internet Protocol multimedia subscription for the user identified by the unique user identifier generating. At 706, the generated Internet Protocol multimedia subscription request message is transmitted by the home base station system to a user database.

Figure 7B:
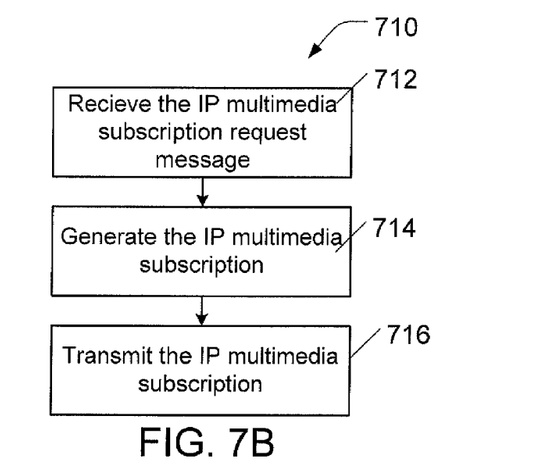

In FIG. 7B, method 710 begins at 712 with receiving by a user database, for example an HLR/HSS, the Internet Protocol multimedia subscription request message. At 714, the user database generates an Internet Protocol multimedia subscription for the user identified by the unique user identifier in the received Internet Protocol multimedia subscription request message. At 716, the user database transmits the Internet Protocol multimedia subscription to the home base station system.

Figure 7C:
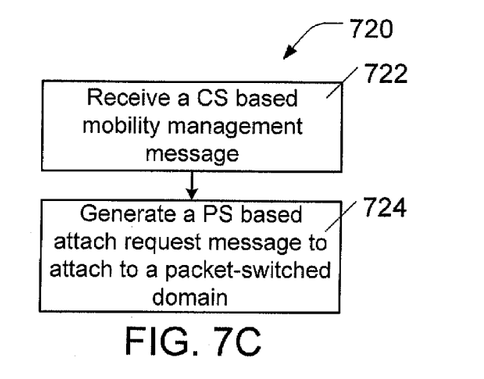

In FIG. 7C, method 720 begins at 722 with a home base station system, receiving a circuit-switched based mobility management message. At 724, the home base station generates a packet-switched based attach request message to attach to a packet-switched domain.

Figure 7D:
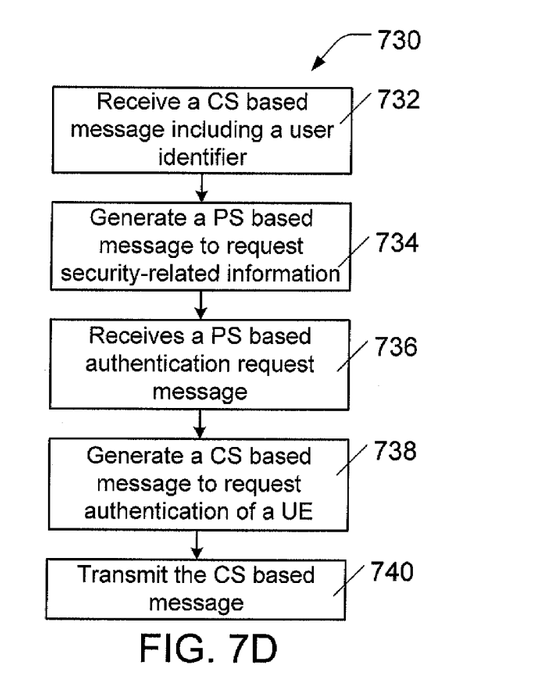

In FIG. 7D, method 730 begins at 732 with a home base station system receiving a circuit-switched based message including a user identifier. At 734, the home base station generates a packet-switched based message to request security-related information associated with the received user identifier. At 736, the home base station system receives a packet-switched based authentication request message. At 738, the home base station system generates a circuit-switched based message to request authentication of a communication device associated with the user identified by the user identifier. At 740, the home base station system transmits the circuit-switched based message to the communication device.

Figure 8:
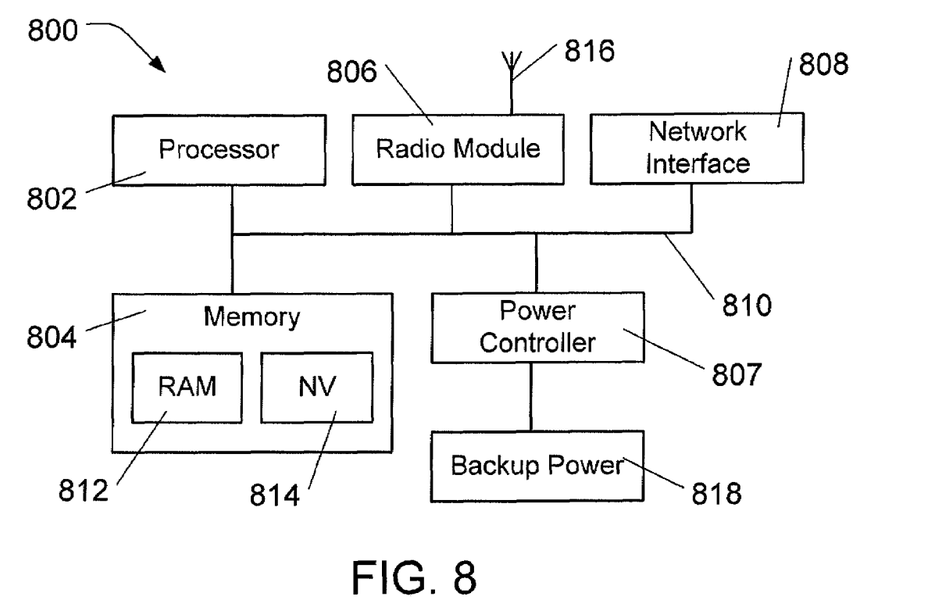
FIG. 8 shows block diagrams of an architecture for a HNB according to an embodiment.

FIG. 8 shows block diagrams of an architecture for HNB 800. HNB 800 includes a processor 802, memory 804, a radio module 806, a power controller 807, and a network interface 208, connected by a bus 810. In some embodiments, the memory 804 may include random access memory 812, such as conventional DRAM, and non-volatile memory 814, such as conventional flash memory, for storing the firmware that operates the HNB 800, as well as other parameters and settings that should be retained by the HNB 800.

The radio module 806 may include an antenna 816, which is used for communication wirelessly with one or more UEs, such as mobile telephones. The network interface 808 connects the HNB 800 to HNB-GW (now shown), and may be a conventional wired network interface, such as a DSL interface, an Ethernet interface, or a USB interface that connects to an external computer or network interface device for connection to HNB-GW (now shown). Alternatively, the network interface 808 may be a wireless network interface that communicates with HNB-GW via a wireless local-area network, a wireless metropolitan area network or a wireless wide area network.

The HNB 800 may be housed in a compact, portable housing (not shown), and may be powered by a conventional home power connection (not shown), via the network interface 808 (e.g., power via a USB connection or power over Ethernet), or by other known methods of powering an electronic device. In some embodiments, the HNB base station 800 may include a backup power source 818, such as a battery (which may be a rechargeable battery) connected to the power controller 807, which may provide power for the HNB 800 to continue operation for a limited duration in the event of a power loss, such as may occur if the HNB 800 is unplugged or switched off.

It will be understood that the architecture shown in FIG. 8 is only one possible architecture for the HNB 800, and that there may be many variations or additions to the architecture. For example, the HNB 800 may include I/O devices, such as a display (not shown), a smart card interface and a smart card (not shown), to verify that the HNB is authorized for operation, or a variety of indicator lights or LEDs (not shown), to indicate the current status of the HNB 800.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

Those of skill in the art would appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For example, the various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

What is claimed is:

1. A home base station subsystem, comprising:
a message generator configured to generate an Internet Protocol multimedia subscription request message comprising a unique user identifier and an information request message, the information request message requesting an Internet Protocol multimedia subscription for the user identified by the unique user identifier; and
a transmitter configured to transmit the generated Internet Protocol multimedia subscription request message to a user database;
wherein the message generator is configured to generate the Internet Protocol multimedia subscription request message further comprising a unique home base station subsystem identifier.

2. A home base station subsystem, comprising:
a message generator configured to generate an Internet Protocol multimedia subscription request message comprising a unique user identifier and an information request message, the information request message requesting an Internet Protocol multimedia subscription for the user identified by the unique user identifier; and
a transmitter configured to transmit the generated Internet Protocol multimedia subscription request message to a user database;
wherein the message generator is configured to generate the Internet Protocol multimedia subscription request message further comprising a Temporary Mobile Station Identity and a home base station subsystem Internet Protocol address.

3. A home base station subsystem, comprising:
a message generator configured to generate an Internet Protocol multimedia subscription request message comprising a temporary unique user identifier in a circuit switched domain received from a user and an information request message, the information request message requesting an Internet Protocol multimedia subscription for the user identified by the unique user identifier; and
a transmitter configured to transmit the generated Internet Protocol multimedia subscription request message to a user database,
wherein the message generator is configured to generate the Internet Protocol multimedia subscription request message further comprising a unique home base station subsystem identifier.

4. The home base station subsystem of claim 3, wherein the transmitter is configured to transmit the generated Internet Protocol multimedia subscription request message to a home location register.

5. A home base station subsystem, comprising:
a message generator configured to generate an Internet Protocol multimedia subscription request message comprising a temporary unique user identifier in a circuit switched domain received from a user and an information request message, the information request message requesting an Internet Protocol multimedia subscription for the user identified by the unique user identifier; and
a transmitter configured to transmit the generated Internet Protocol multimedia subscription request message to a user database,
wherein the message generator is configured to generate the Internet Protocol multimedia subscription request message further comprising a Temporary Mobile Station Identity and a home base station subsystem Internet Protocol address.

6. The home base station subsystem of claim 5, wherein the transmitter is configured to transmit the generated Internet Protocol multimedia subscription request message to a home location register.

7. A user database system comprising:
a receiver configured to receive an Internet Protocol multimedia subscription request message comprising a unique user identifier and an information request message, the information request message requesting an Internet Protocol multimedia subscription for the user identified by the unique user identifier;
an Internet Protocol multimedia subscription generator configured to generate an Internet Protocol multimedia subscription for the user identified by the unique user identifier in the received Internet Protocol multimedia subscription request message; and
a transmitter configured to transmit the Internet Protocol multimedia subscription to a home base station subsystem, wherein the user database system comprises a home location register.

8. The user database system of claim 7, wherein the receiver is configured to receive an indicator that the Internet Protocol multimedia subscription will be used for voice services.

9. The user database system of claim 7, wherein the Internet Protocol multimedia subscription generator is configured to generate an Internet Protocol multimedia subscription comprising an Internet Protocol Multimedia Public Identity.

10. The user database system of claim 9, wherein the Internet Protocol multimedia subscription generator is configured to generate the Internet Protocol multimedia subscription further comprising a generated random number.

11. The user database system of claim 7 further comprising a subscription module configured to determine whether the Internet Protocol multimedia subscription is allowed for the user identified by the unique user identifier.

12. A user database system comprising:
a receiver configured to receive an Internet Protocol multimedia subscription request message comprising a unique user identifier and an information request message, the information request message requesting an Internet Protocol multimedia subscription for the user identified by the unique user identifier;
an Internet Protocol multimedia subscription generator configured to generate an Internet Protocol multimedia subscription for the user identified by the unique user identifier in the received Internet Protocol multimedia subscription request message; and
a transmitter configured to transmit the Internet Protocol multimedia subscription to a home base station subsystem,
wherein the receiver is configured to receive the Internet Protocol multimedia subscription request message further comprising a unique home base station subsystem identifier.

13. The user database system of claim 12, wherein the receiver is configured to receive an indicator that the Internet Protocol multimedia subscription will be used for voice services.

14. The user database system of claim 12, wherein the Internet Protocol multimedia subscription generator is configured to generate an Internet Protocol multimedia subscription comprising an Internet Protocol Multimedia Public Identity.

15. The user database system of claim 14, wherein the Internet Protocol multimedia subscription generator is configured to generate the Internet Protocol multimedia subscription further comprising a generated random number.

16. The user database system of claim 12 further comprising a subscription module configured to determine whether the Internet Protocol multimedia subscription is allowed for the user identified by the unique user identifier.

17. A user database system comprising:
a receiver configured to receive an Internet Protocol multimedia subscription request message comprising a unique user identifier and an information request message, the information request message requesting an Internet Protocol multimedia subscription for the user identified by the unique user identifier;
an Internet Protocol multimedia subscription generator configured to generate an Internet Protocol multimedia subscription for the user identified by the unique user identifier in the received Internet Protocol multimedia subscription request message; and
a transmitter configured to transmit the Internet Protocol multimedia subscription to a home base station subsystem,
wherein the Internet Protocol multimedia subscription generator is configured to generate an Internet Protocol multimedia subscription comprising an Internet Protocol Multimedia Public Identity,
wherein the Internet Protocol multimedia subscription generator is configured to generate the Internet Protocol multimedia subscription further comprising a generated random number, and
wherein the Internet Protocol multimedia subscription generator is configured to generate the Internet Protocol multimedia subscription further comprising a second unique user identifier.

18. A user database system comprising:
a receiver configured to receive an Internet Protocol multimedia subscription request message comprising a unique user identifier and an information request message, the information request message requesting an Internet Protocol multimedia subscription for the user identified by the unique user identifier;
an Internet Protocol multimedia subscription generator configured to generate an Internet Protocol multimedia subscription for the user identified by the unique user identifier in the received Internet Protocol multimedia subscription request message; and
a transmitter configured to transmit the Internet Protocol multimedia subscription to a home base station subsystem,
wherein the user database system is further configured to set an Internet Protocol Multimedia Subsystem as a paging location for the user identified by the unique user identifier.

* * * * *